(12) United States Patent
Hennum et al.

(10) Patent No.: US 7,360,167 B2
(45) Date of Patent: Apr. 15, 2008

(54) USER INTERFACE EXPANDER AND COLLAPSER

(75) Inventors: Erik F. Hennum, San Francisco, CA (US); Sandra D. Kipp, Raleigh, NC (US); Mark E. Molander, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 701 days.

(21) Appl. No.: 10/794,518

(22) Filed: Mar. 5, 2004

(65) Prior Publication Data
US 2005/0198582 A1 Sep. 8, 2005

(51) Int. Cl.
*G09G 5/00* (2006.01)
(52) U.S. Cl. .................. 715/772; 345/853; 345/619
(58) Field of Classification Search .......... 345/619
See application file for complete search history.

(56) References Cited

U.S. PATENT DOCUMENTS

| | | | |
|---|---|---|---|
| 5,301,348 A | 4/1994 | Jaaskelainen | 395/800 |
| 5,345,550 A | 9/1994 | Bloomfield | 395/156 |
| 5,528,744 A | 6/1996 | Vaughton | 395/157 |
| 5,801,703 A | 9/1998 | Bowden et al. | 345/357 |
| 5,808,610 A | 9/1998 | Benson et al. | 345/342 |
| 5,986,657 A | 11/1999 | Berteig et al. | 345/357 |
| 6,043,816 A * | 3/2000 | Williams et al. | 715/783 |
| 6,075,531 A | 6/2000 | DeStefano | 345/340 |
| 6,268,862 B1 * | 7/2001 | Uchiyama et al. | 345/427 |
| 6,380,957 B1 * | 4/2002 | Banning | 715/828 |
| 6,549,222 B1 | 4/2003 | Skoll | 345/856 |
| 7,181,684 B2 * | 2/2007 | Chittu et al. | 715/514 |
| 2002/0107892 A1 * | 8/2002 | Chittu et al. | 707/514 |
| 2003/0202019 A1 * | 10/2003 | Detweiler et al. | 345/853 |
| 2004/0239683 A1 * | 12/2004 | Chu et al. | 345/619 |
| 2007/0011297 A1 * | 1/2007 | Boylan et al. | 709/223 |
| 2007/0050697 A1 * | 3/2007 | Lewis-Bowen et al. | 715/503 |

OTHER PUBLICATIONS

"Sam Teach Yourself Lotus Notes 4.6 in 24 Hours", Published 1999 by Macmillan Computer Publishing, pp. 1, 2, 69 & 70.*
"Using Word and Excel in Office 97"; by Ron Person, Rob Tidro and Rick Winter, et al.; Published QUE in 1998; p. iii, iv, 340-343.*
Anonymous, "Window Hierarchy Compression", Dec. 1991, 1 pg., Research Disclosure, No. 332, Kenneth Mason Publications Ltd, England.
"Tree Navigator—A Concept for Navigation in Big Trees", Aug. 2001, 4 pgs., 1384/Research Disclosure.

* cited by examiner

*Primary Examiner*—Doug Hutton
*Assistant Examiner*—Gregory A DiStefano
(74) *Attorney, Agent, or Firm*—Harrington & Smith, PC

(57) ABSTRACT

A method of indicating expanded states and collapsed states of lower level expander/collapser items in a higher level visual control of a user interface display. The method includes providing, in the higher level visual control, a lower level expander/collapser indicator area; displaying a first display in the expander/collapser indicator area when all the lower level expander/collapser items are in a first state; displaying a second different display in the expander/collapser indicator area when all of the lower level expander/collapser items are in a second different state; and displaying a third different display in the expander/collapser indicator area when a first one of the lower level expander/collapser items is in the first state and a second one of the lower level expander/collapser items is not in the first state.

13 Claims, 6 Drawing Sheets

USER INTERFACE EXPANDER AND COLLAPSER

BACKGROUND OF THE INVENTION

1. Field of the Invention

The present invention relates to a user interface display and, more particularly, to a method and system for expanding and collapsing expandable and collapsible items in a display and indicating states of expandable and collapsible items.

2. Brief Description of Prior Developments

As user interface (UI) displays continually get loaded with ever increasing amounts of information, there is a correspondingly increasing need for users to have good ways to quickly and easily control the amount of information getting presented per situation or context. Various different types of controls for expanding and collapsing expandable and collapsible items in displays are known. Twistie controls are a type of easy-to-use expander-collapser control popular in many International Business Machine Corporation (IBM) products. Other similar formats for expanding and collapsing subordinate levels of information are the "+" and "−" tree view controls in Microsoft WINDOWS, and the turner control in JAVA which expands and collapses the corresponding containers. This disclosure will henceforth use the term "expander/collapser items" generically to cover all forms of expanders and collapsers.

A problem today is that many times multiple expander/collapser items are embedded within information, such as notes or helps, and there is not a surface-level graphic control to expand all or collapse all of the expander/collapser items at a same time. Under a View pull-down menu there might be choices to "Expand all sections" and "Collapse all sections", but these are menu choices and not presented on the surface; whereas expander/collapser items controls directly embedded within the UI always display the current status of the expander/collapser items, which is always the opposite of the action (if a section is twisted open, the twistie will display as being expanded, not directly indicating the action that clicking it will collapse it). So, the first problem with providing a visual surface-level and higher-level control of lower level expander/collapser items is that it does not map 100% with the lower-level expander/collapser item controls. A visual surface-level and higher-level control has not been provided which can reflect the current status or states of lower-level expander/collapser items.

A second problem today with surfaced higher-level expander/collapser controls is in regard to a mixed state when some of their subordinate or lower level expander/collapser items are expanded and some are collapsed. Current surfaced higher-level expander/collapser controls do not indicate mixed state conditions. Not only is a mixed state not reflected, but also two possible actions (i.e., expand and collapse) in a mixed state are not both available. In a non-mixed state condition just one action is shown in today's surfaced higher-level expander/collapser controls (i.e., expand or collapse). Tree views and turner controls in macro tree controls allow higher-level expanding and contracting, but do not indicate mixed conditions when some sub nodes are expanded and some are collapsed.

A third problem is that the low-level expander/collapser items of today need to act independently of one another. A UI designer today could not easily allow only one expander/collapser items to be expanded at time; which might save the user from resizing the pane or scrolling. This is because some users are going to want to expand more than one expander/collapser item at a time. Most might want to expand only one expander/collapser item at a time in most situations. So, for lowest-common-denominator coverage, current UI displays handle the worst case of highly flexible (independent expander/collapser items), but do not have a self-maintaining way to collapse un-needed items (i.e., expanding a second expander/collapser item would automatically collapse a previously expanded first expander/collapser item).

Typically, expander/collapser item controls today are provided at the item level; not higher a level. So, rarely if ever do expander/collapser item controls appear to expand or collapse all the branches of a tree; just one branch at a time. This is a hard problem to solve because of the interplay of action versus status indications are inherently opposite; as well how to handle the in-between state when some expander/collapser items are already open while others are closed. Another problem is how to keep this control at the surface and as a single control, and not let it get to be spread out over too many buttons and status indicators which would make it more cumbersome and harder to deal with. There is a desire to provide a surface-level visual control to expand all or collapse all lower level expander/collapser items at a same time. This is a desire to provide a visual surface-level and higher-level control that can reflect the current status or states of lower-level expander/collapser items. There is a desire to provide a surfaced higher-level expander/collapser control which can indicate mixed state conditions of lower level expander/collapser items. This is also a desire to provide two possible actions (i.e., expand and collapse) in a mixed state indication area which allows both actions (i.e., expand and collapse) to be selectively available. There is also a desire to provide a UI display that can be highly flexible (independent expander/collapser items) or could have a self-maintaining way to collapse un-needed items (i.e., expanding a second expander/collapser item would automatically collapse a previously expanded first expander/collapser item), and also allow for all expansion or all collapse actions.

SUMMARY OF THE INVENTION

In accordance with one method of the present invention, a method is provided for indicating expanded states and collapsed states of lower level expander/collapser items in a higher level visual control of a user interface display. The method includes providing, in the higher level visual control, a lower level expander/collapser indicator area; displaying a first display in the expander/collapser indicator area when all the lower level expander/collapser items are in a first state; displaying a second different display in the expander/collapser indicator area when all of the lower level expander/collapser items are in a second different state; and displaying a third different display in the expander/collapser indicator area when a first one of the lower level expander/collapser items is in the first state and a second one of the lower level expander/collapser items is not in the first state.

In accordance with one aspect of the present invention, a user interface control system is provided comprising a system for displaying a mixed state expander/collapser icon area in a lower level expander/collapser indicator area of a higher level visual control when lower level expander/collapser items include at least one of the items being in an expanded state and at least another one of the items being in a collapsed state, wherein the icon area comprises a first mixed state action icon adapted to expand all the lower level expander/collapser items to the expanded state and a second mixed state action icon adapted to collapse all the lower level expander/collapser items to the collapsed state; and a system for changing display in the indicator area. The system for changing is adapted to change a display of the mixed state expander/collapser icon area in the indicator area into an expander icon after the second mixed state action icon is selected. The system for changing is adapted to change the mixed state expander/collapser icon area into a collapser icon after the first mixed state action icon is selected.

In accordance with another aspect of the present invention, a program storage device readable by a machine, tangibly embodied in a program of instructions executable by the machine to perform method steps is provided for indicating expanded states and collapsed states, in a higher level visual control, of lower level expander/collapser items in a user interface display. The method comprises providing a lower level expander/collapser indicator area in the higher level visual control; displaying a first display in the expander/collapser indicator area when all the lower level expander/collapser items are in a collapsed state; displaying a second different display in the expander/collapser indicator area when all of the lower level expander/collapser items are in an expanded state; and displaying a third different display in the expander/collapser indicator area when at least one of the lower level expander/collapser items is in the collapsed state and at least another one of the lower level expander/collapser items is in the expanded state.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
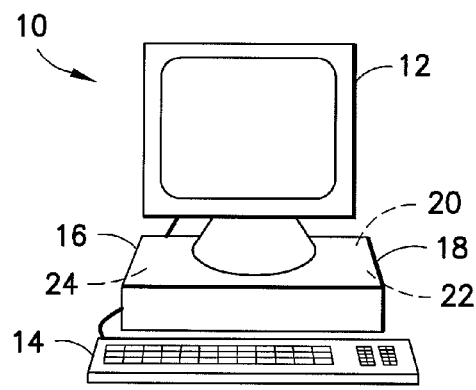
FIG. 1 is a front view of a computer incorporating features of the present invention.

Referring to FIG. 1, there is shown a front view of an electronic apparatus 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The electronic apparatus 10 in the embodiment shown comprises a computer system, such as a desktop personal computer (PC). However, in alternate embodiments, features of the present invention could be used in any suitable type of electronic device having a user interface (UI) display, such as a PDA for example. The electronic apparatus 10 comprises a display 12, a keyboard 14, and a main unit 16. The display 12 and keyboard 14 are generally known in the art. The main unit 16 comprises a housing 18 and electronic circuitry and components housed within the housing 18. The electronic circuitry and components include a memory 20, a processor 22, and a video driver 24 for displaying images on the screen of the display 12. As is conventionally known, the electronic apparatus could comprise other computer related devices or system. In one type of embodiment, the display could comprise a touch screen.

Figure 2:
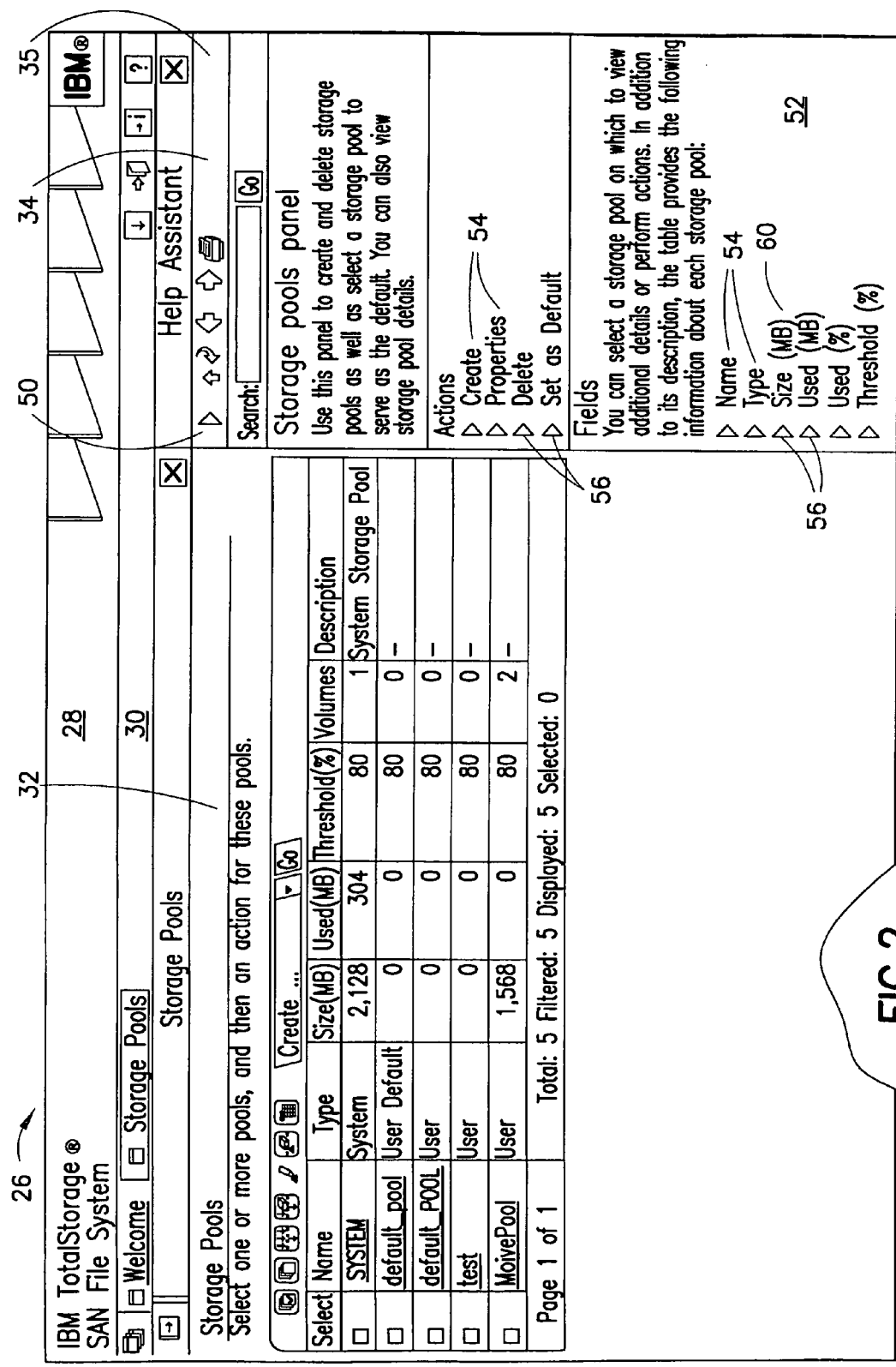
FIG. 2 is a view of a display on the screen of the display shown in FIG. 1.

Referring also to FIG. 2, a window 26 is shown of an example of information displayed on the screen of the display 12. The window 26 includes a title bar 28, a task/tool bar 30, and frames 32, 34. The window could contain more or less than two frames. In alternate embodiments, the window 26 could also include a menu bar and/or a status, etc. In this embodiment the first frame 32 is the main content area. The second frame 34 is a supporting help area. In this embodiment the second frame is called the "Help Assistant." However, features of the present invention could be used in a main content area, navigation area, or used in any suitable type of other frames, panes, areas, or portions of a window.

Figure 3:
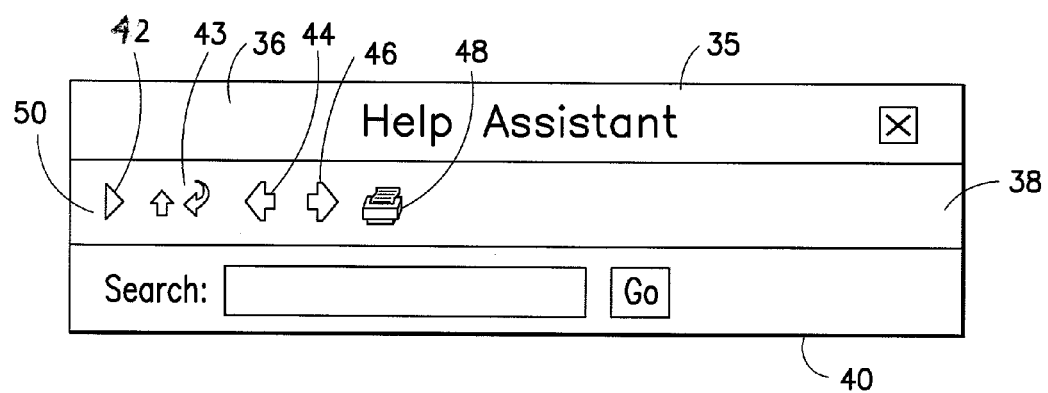
FIG. 3 is an enlarged view of the upper portion of the right-side frame shown in FIG. 2.

Referring also to FIG. 3, an enlarged view of the upper portion 35 of the Help Assistant frame 34 is shown. The frame comprises a title bar 36, a tool bar 38, and a search bar 40. The tool bar 38 comprises five tool bar icon buttons. The tool bar icon buttons comprise an expand button 42, a return button 43, a back button 44, a forward button 46 and a print button 48. The return button 43, back button 44, forward button 46 and print button 48, and the search bar 40 are generally well known in the art. The expand button 42 is located in a lower level expander/collapser indicator area 50 of the tool bar 38. In this embodiment the indicator area 50 has a substantially fixed size and shape. However, in alternate embodiments the size or shape could change. The indicator area 50 provides, in the higher level visual control in the tool bar 38, a control for expanding and collapsing all of the lower level expanded/collapsed items 54 as further understood below with regard to a comparison of FIGS. 3, 4 and 5. In an alternate embodiment, the indicator area 50 could appear elsewhere, such as in the window's task/tool bar 30, or could appear in multiple sub-headers (e.g., next to "Actions" and "Fields").

The display in the indicator area 50 is adapted to change based upon the status or state of lower level expander/collapser items 54 in the lower portion 52 of the frame 34. Thus, the tool bar 38 can also function as a status bar regarding indication of the expanded and collapsed states of the lower level expander/collapser items 54 in the lower portion 52 of the frame 34. The lower level expander/collapser items 54 are all shown in FIG. 2 in a collapsed state. The lower level expander/collapser items 54 each have their own state indicator 56 or 58 (see FIG. 4). In this embodiment, the state indicators 56, 58 comprise general arrow shapes. However, in alternate embodiments any suitable type of state indicators could be provided, such as "+" and "−" symbols or line (-) and box (□) symbols for example.

Figure 4:
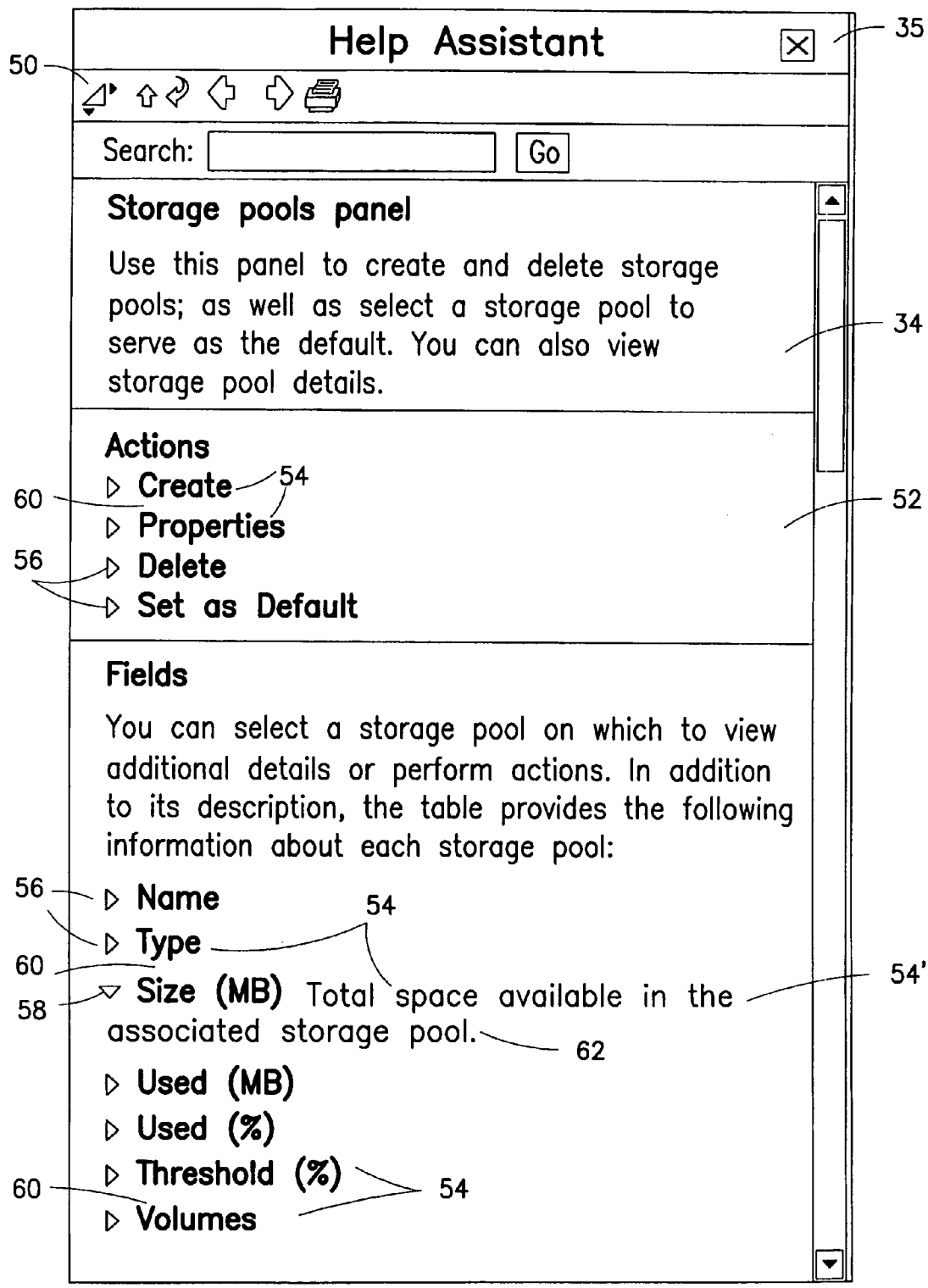
FIG. 4 is a view of the right-side frame shown in FIG. 2 with one lower level expander/collapser item in an expanded state and the other lower level expander/collapser items in a collapsed state.
Figure 5:
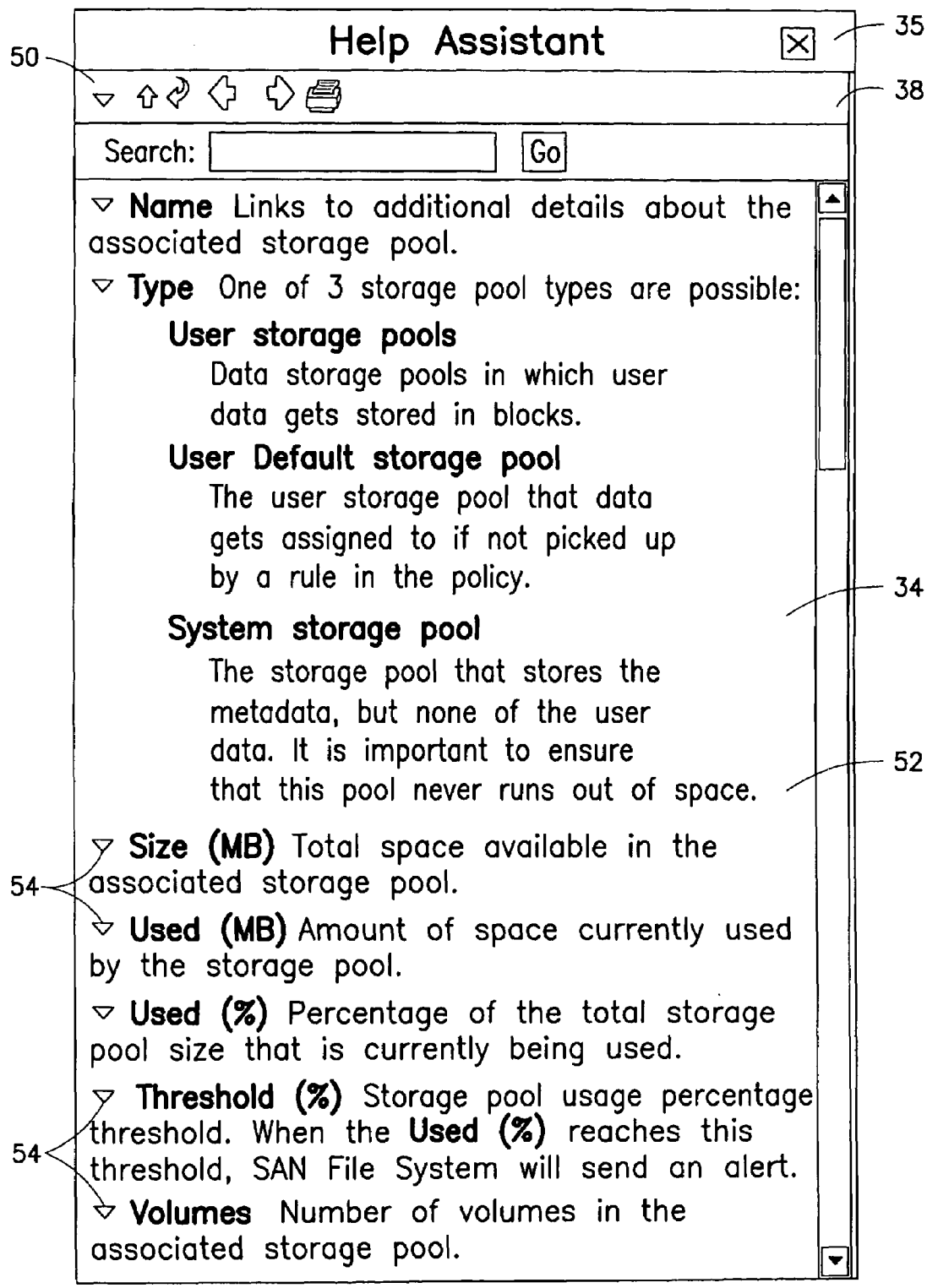
FIG. 5 is a view of the frame shown in FIG. 4 with all the lower level expander/collapser item in an expanded state.

In the embodiment shown, the first state indicators 56 comprise a first general arrow shape pointing to the right. Referring also to FIG. 4, the frame 34 is shown with one of the expander/collapser items 54' expanded from its collapsed state (a first state) to an expanded state (a second state), but the other expander/collapser items 54 remaining in the collapsed state. In order to arrive at this condition, the user has selected the expander/collapser item of the item 54 (in this case "Size") from the display in FIG. 2. The second state indicators 58 comprise a general arrow shape pointing downward as seen in FIG. 4. The first state indicator 56 indicates a collapsed state of its respective expander/collapser item 54. The second state indicator 58 indicates an expanded state of its respective expander/collapser item 54. In this embodiment, the expander/collapser item 54 comprises merely a title section 60, such as "Size" for example, when in a collapsed state. As seen in FIGS. 4 and 5, when in an expanded state, the expander/collapser items 54 each comprise both the title section 60 and an additional information section 62. In alternate embodiments, the title section 60 could comprise additional information. In addition, the additional information section 62 could comprise additional lower level expander/collapser items establishing additional lower levels or hyperlinks, for example. Note that now the higher level expander/collapser in area 50 in the upper left indicates that not all of its lower level expander/collapser items are either bipolarly totally expanded or totally collapsed. Also, note that two actions instead of one are possible at this point. The user is able to either expand all lower level expander/collapser items or collapse them all. To do this, the control in this mixed state is provided by two action buttons instead of one; one to collapse all subordinate lower level expander/collapser items (right pointing arrow) and one to expand all (down pointed arrow). Current highest-level status is also displayed, which is shown as being between the two states of all low-level items are collapsed and all low-level items are expanded (arrow pointing to the lower right).

The state indicators 56, 58 and/or the title sections 60 perform the function, when selected by a user (such as with the click of a mouse or scroll curser, or with a touch screen), of switching or toggling the states of their respective expander/collapser items 54 between the first and second states (i.e., between a collapsed state and an expanded state). In one type of embodiment, the expander/collapser items 54 are each separately and independently expandable and collapsible. However, in an alternate embodiment the electronic apparatus 10 could be adapted to automatically collapse a first expander/collapser item 54 when a second expander/collapser item 54 is expanded. This could provide the feature of the frame 34 not having to be resized or scrolled by the user to see most pertinent information; or having to manually and individually collapse previously expanded expander/collapser item(s) 54. FIG. 5 shows the window 34 when all of the expander/collapser items 54 have been expanded to an expanded state.

Figure 6:
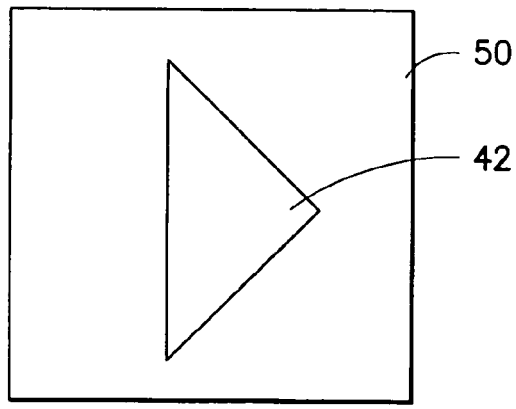
FIG. 6 is an enlarged view of the indicator area in the tool bar shown in FIGS. 2 and 3.
Figure 7:
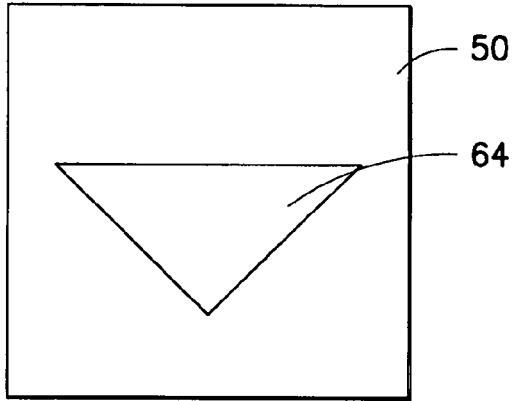
FIG. 7 is an enlarged view of the indicator area in the tool bar shown in FIG. 5.
Figure 8:
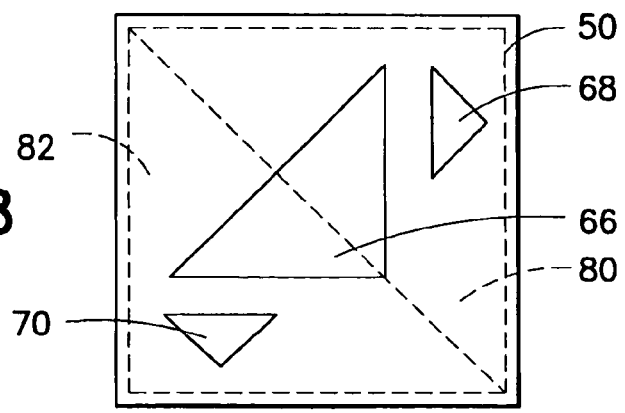
FIG. 8 is an enlarged view of the indicator area in the tool bar shown in FIG. 4.

As seen in comparing FIGS. 2, 4 and 5, the tool bar 38 at the upper portion of the frame 34 changes based upon the states or status of the lower level expander/collapser items 54. Referring also to FIGS. 6, 7 and 8, when all of the lower level expander/collapser items 54 are in a collapsed state as seen in FIG. 2, the indicator area 50 displays a first display as seen in FIG. 6. In this embodiment the first display comprises the expand button 42 with a general arrow shape pointing to the right. When all of the lower level expander/collapser items 54 are in an expanded state as seen in FIG. 5, the indicator area 50 displays a second display as seen in FIG. 7. In this embodiment the second display comprises a collapse button 64 with a general arrow shape pointing downward. When at least one of the lower level expander/collapser items 54 is in a collapsed state and at least another one of the lower level expander/collapser items 54 is in an expanded state as seen in FIG. 4, the indicator area 50 displays a third display as seen in FIG. 8. This condition is referred to herein as a mixed state of the lower level expander/collapser items 54. In this embodiment the third display comprises a general status arrow shape 66 pointing diagonally down and to the right. The third display also comprises two different mixed state action buttons or indicators 68, 70. In alternate embodiments, the three displays could comprise any suitable types of displays, such as including plus "+" and minus "−" symbols or line (−) and box (□) symbols for example. The first mixed state action indicator 68 comprises with a general arrow shape pointing to the right. The second mixed state action indicator 70 comprises with a general arrow shape pointing downward. The first mixed state action indicator 68 is located on the right side of the arrow 66 and the second mixed state action indicator 70 is located on the bottom side of the arrow 66. With all displays as shown in FIGS. 6-8, the size and shape of the overall indicator/button area 50 stays substantially the same. Thus, the toolbar 38 does not need to be resized, or the frame 34 otherwise changed.

When all of the lower level expander/collapser items 54 are in a collapsed state as seen in FIG. 2, if the user selects the expand button 42 all of the lower level expander/collapser items 54 are switched to their expanded states as seen in FIG. 5 and the indictor area 50 is switched to display the collapse button 64. When all of the lower level expander/collapser items 54 are in an expanded state as seen in FIG. 5, if the user selects the collapse button 64 all of the lower level expander/collapser items 54 are switched to their collapsed states as seen in FIG. 2 and the indictor area 50 is switched to display the expand button 42. When one of the lower level expander/collapser items 54 is in an expanded state and at least one other lower level expander/collapser item 54 is in a collapsed state as seen in FIG. 4 (by selecting one of the lower level expander/collapser items 54) then the indictor area 50 is switched to display the third display shown in FIG. 8.

All of the lower level expander/collapser items 54 could be individually expanded or collapsed to convert the indicator area 50 into either the first display or the second display. Alternatively, the user could use the mixed state action buttons 68 or 70 in the third display shown in FIG. 8 to expand all the lower level expander/collapser items 54 or collapse all the lower level expander/collapser items 54, respectively. The mixed state action buttons 68, 70 only appear during a mixed state condition. Selecting the collapse-all action button 68 collapses all of the lower level expander/collapser items 54 to a collapsed state. The indicator area 50 also automatically changes to the first display shown in FIGS. 2 and 6. Selecting the expand-all action button 70 expands all of the lower level expander/collapser items 54 to an expanded state. The indicator area 50 also automatically changes to the second display shown in FIGS. 5 and 7.

In one type of embodiment, such as when there are multiple levels of lower levels of expandable and collapsible items, displaying the third different display occurs when only a first lower level immediately beyond the higher level visual control contains both items in the first state and items not in the first state, and does not occur when a second deeper lower level beyond the first lower level contains both items in the first state and items not in the first state. In another alternate embodiment, displaying the third different display occurs when a first lower level immediately beyond the higher level visual control contains both items in the first state and items not in the first state, and when a second deeper lower level beyond the first lower level contains both items in the first state and items not in the first state.

One of the features of the present invention is the ability of the indicator area to indicate more than two states or statuses of the expanded and collapsed states of the lower level expander/collapser items 54. In the embodiment described above, the indicator area 50 can display three states; all collapsed, all expanded, or a mixed state (at least one expanded and at least one collapsed). In an alternate embodiment, the indicator area can be adapted to display more than three statuses, such as more than one different type of mixed state condition. The indicator area 50 forms a surface-level, higher-level hierarchical expander and collapser for the lower level expander/collapser items 54. In addition to the ability to display more than two states or statuses of the expanded and collapsed states of the lower level expander/collapser items 54, the present invention can provide a mixed state display with more than one selectable action and corresponding action indicators. The first and second displays, in this embodiment, each only have one action button presented at a time; either an expand button or a collapse button, respectively. The third display, on the other hand, has two action buttons 68, 70 to simultaneously allow a user to select one of two possible actions; expand all or collapse all. In alternate embodiments, more than two action buttons could be provided in the third display. The area for these two related buttons could be separated and directly over the corresponding action indicators (ignoring the status indicator), or conjoined more as depicted by the two triangular hot spot areas 80, 82 outlined in FIG. 8. Selectable areas form different regions in the same overall indicator area 50. Another alternative might be to highlight each action choice (68 and 70) on a mouse-over event to make the action more self-evident.

The electronics in the electronic apparatus 10 and the programming form a user interface control system comprising a system for displaying a mixed state expander/collapser icon area in a lower level expander/collapser indicator area of a higher level visual control when lower level expander/collapser items include at least one of the items being in an expanded state and at least another one of the items being in a collapsed state, wherein the icon area comprises an expand-all action button adapted to expand all the lower level expander/collapser items to the expanded state and a collapse-all action button adapted to collapse all the lower level expander/collapser items to the collapsed state. The electronics in the electronic apparatus 10 and the programming form a user interface control system comprising a system for changing display in the indicator area. The system for changing is adapted to change a display of the mixed state expander/collapser icon area in the indicator area into an expander icon/button after the collapse-all action button is selected. The system for changing is adapted to change the mixed state expander/collapser icon area into a collapser icon/button after the expand-all action button is selected.

Figure 9:
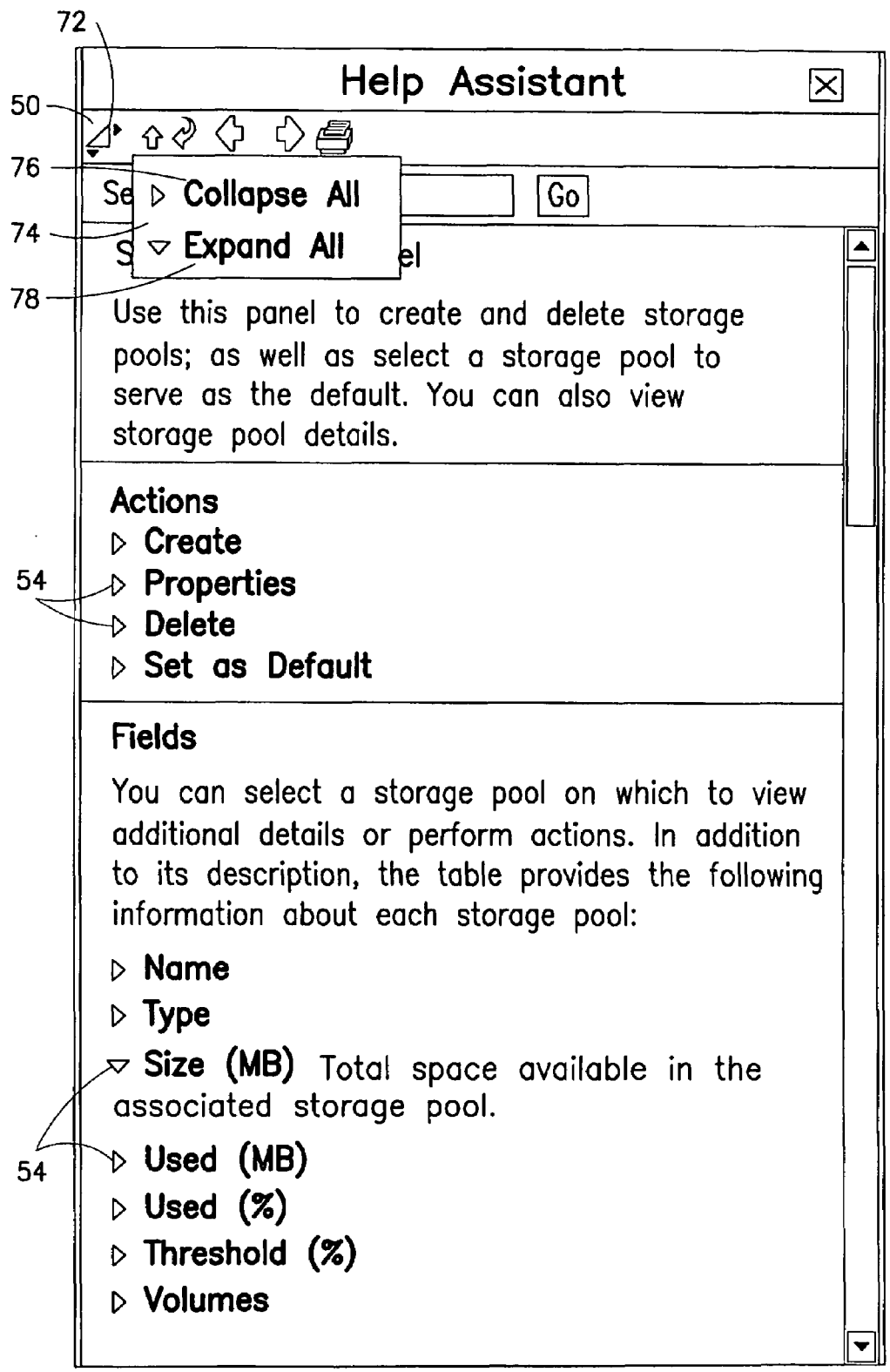
FIG. 9 is a view of the frame shown in FIG. 4 with one lower level expander/collapser item in an expanded state and the other lower level expander/collapser items in a collapsed state and showing an alternate drop down or pop-up window.

Referring now to FIG. 9, an alternate embodiment of the present invention is shown. In this embodiment the third display does not comprise more than one mixed state action button. Instead, the third display in the indicator area 50 comprises a single drop down menu button 72 having the same symbols as shown in FIG. 8. When a user selects the button 72 or positions the cursor on top of the button 72, a menu 74 drops down. The menu 74 comprises two selectable action choices 76 and 78. When the first action choice 76 is selected by a user, all of the lower level expander/collapser items 54 are collapsed. When the second action choice 78 is selected by a user, all of the lower level expander/collapser items 54 are expanded. This embodiment overcomes any problem which might occur with the icons 68, 70 being too small, such as in a relatively small size display screen in a portable electronic device, such as a PDA for example.

The present invention can provide a surface-level and higher-level hierarchical expander and collapser. The invention can provide a single higher-level mutli-state expander/collapser item control to expand and collapse multiple sub-expander/collapser items at a time. This is advantageous as a powerful way to manipulate UI areas within the minimal space of one tool bar button. It has not been done before because of the complications between presenting actions versus status; the problem with how to handle the in-between state when some of the minor expander/collapser items are expanded and some are collapsed, and the problem of presenting two actions instead of one action when in the mixed state.

The benefits of this invention include:

Single-button space is very small (with the present invention space efficient is provided on the display);

More powerful than today's alternative (with the present invention full expansions or collapsing is only a single click away);

Intuitive (status oriented presentation; not action oriented which would be counter to sub-level expander/collapser items);

Surfaces the function, which makes it more convenient (user doesn't have to go try to find it in a pull-down menu);

Could allow a more efficient sub-level expander/collapser item mode of operation in which only a single expander/collapser item could be directly expanded at a time (when expanding a second expander/collapser item, the currently expanded one would collapse), with the override capability of expanding all of the expander/collapser items coming from the higher-level expander/collapser item control.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A program storage device readable by a machine, tangibly embodied in a program of instructions executable by the machine to perform operations to indicate expanded states and collapsed states, in a higher level visual control tool bar, of lower level expander/collapser items in an area of a user interface display separate from the higher level visual control tool bar, the operations comprising:

providing a lower level expander/collapser indicator area in the higher level visual control tool bar;

displaying a first display in the expander/collapser indicator area when all the lower level expander/collapser items are in a collapsed state;

displaying a second different display in the expander/collapser indicator area when all of the lower level expander/collapser items are in an expanded state; and displaying a third different display in the expander/collapser indicator area when at least one of the lower level expander/collapser items is in the collapsed state and at least another one of the lower level expander/collapser items is in the expanded state.

2. The program storage device as in claim 1 wherein, during display of the third display, the operation comprises displaying at least two different mixed state action buttons in the lower level expander/collapser indicator area of the higher level visual control tool bar.

3. The program storage device as in claim 1 further comprising maintaining the lower level expander/collapser indicator area as a substantially same size when displaying the first, second and third displays in the indicator area.

4. A method of indicating expanded states and collapsed states of lower level expander/collapser items of a user interface display in a higher level visual control tool bar separate from an area having the lower level expander/collapser items, the method comprising:

providing, in the higher level visual control tool bar, a lower level expander/collapser indicator area;

displaying a first display in the expander/collapser indicator area when all the lower level expander/collapser items are in a first state;

displaying a second different display in the expander/collapser indicator area when all of the lower level expander/collapser items are in a second different state; and displaying a third different display in the expander/collapser indicator area when a first one of the lower level expander/collapser items is in the first state and a second one of the lower level expander/collapser items is not in the first state.

5. The method as in claim 4 wherein displaying the third different display comprises displaying at least two different mixed state action buttons in the lower level expander/collapser indicator area of the higher level visual control tool bar.

6. The method as in claim 4 further comprising maintaining the lower level expander/collapser indicator area as a substantially same size when displaying the first, second and third displays in the indicator area.

7. The method as in claim 6 wherein displaying the third different display comprises providing a plus (+) shaped button and a minus (−) shaped button in the indicator area.

8. The method as in claim 4 wherein displaying the third different display occurs when only a first lower level immediately beyond the higher level visual control tool bar contains both items in the first state and items not in the first state, and does not occur when a second deeper lower level beyond the first lower level contains both items in the first state and items not in the first state.

9. The method as in claim 4 further comprising:
selecting a first action button in the higher level visual control toolbar of the third display to expand all the expander/collapser items in the lower level to the second state, wherein the second state comprises an expanded state.

10. The method as in claim 9 further comprising:
selecting a second action button in the higher level visual control toolbar of the third display to collapse all the expander/collapser items in the lower level to the first state, wherein the first state comprises a collapsed state.

11. A method of indicating expanded states and collapsed states of lower level expander/collapser items in a higher level visual control tool bar, displayed separately from the lower level expander/collapser items, of a user interface display the method comprising:

providing, in the higher level visual control tool bar, a lower level expander/collapser indicator area;

displaying a first display in the expander/collapser indicator area when all the lower level expander/collapser items are in a first state;

displaying a second different display in the expander/collapser indicator area when all of the lower level expander/collapser items are in a second different state;

displaying a third different display in the expander/collapser indicator area when a first one of the lower level expander/collapser items is in the first state and a second one of the lower level expander/collapser items is not in the first state; and maintaining the lower level expander/collapser indicator area as a substantially same size when displaying the first, second and third displays in the indicator area, wherein displaying the third different display comprises providing two arrow shaped buttons in the indicator area pointing in different directions.

12. A method of indicating expanded states and collapsed states of lower level expander/collapser items in a higher level visual control tool bar, displayed separately from the lower level expander/collapser items, of a user interface display, the method comprising:

providing, in the higher level visual control toolbar, a lower level expander/collapser indicator area;

displaying a first display in the expander/collapser indicator area when all the lower level expander/collapser items are in a first state;

displaying a second different display in the expander/collapser indicator area when all of the lower level expander/collapser items are in a second different state; and displaying a third different display in the expander/collapser indicator area when a first one of the lower level expander/collapser items is in the first state and a second one of the lower level expander/collapser items is not in the first state, wherein displaying the third different display occurs when a first lower level immediately beyond the higher level visual control tool bar contains both items in the first state and items not in the first state, and when a second deeper lower level beyond the first lower level contains both items in the first state and items not in the first state.

13. A method of expanding expander/collapser items in a lower level of a user interface display comprising:

indicating expanded states and collapsed states of lower level expander/collapser items in a higher level visual control tool bar, displayed separately from the lower level expander/collapser items, of a user interface display, comprising:

providing, in the higher level visual control tool bar, a lower level expander/collapser indicator area;

displaying a first display in the expander/collapser indicator area when all the lower level expander/collapser items are in a first state;

displaying a second different display in the expander/collapser indicator area when all of the lower level expander/collapser items are in a second different state;

displaying a third different display in the expander/collapser indicator area when a first one of the lower level expander/collapser items is in the first state and a second one of the lower level expander/collapser items is not in the first state;

allowing only one expander/collapser item in the lower level to be expanded at any one time when the expander/collapser item is directly expanded by selection of a user; and expanding all the expander/collapser items in the lower level when an action button in the indicator area of the higher level visual control tool bar is selected by the user.

\* \* \* \* \*